United States Patent [19]
Leibling

[11] Patent Number: 5,372,229
[45] Date of Patent: Dec. 13, 1994

[54] DEVICE FOR DELIVERING FLOWABLE BULK CARGO

[75] Inventor: Udo Leibling, Bingen, Germany

[73] Assignee: Th. Rasmussen Molle- OG Maskinbyggeri A/S, Herning, Denmark

[21] Appl. No.: 108,680

[22] PCT Filed: Mar. 12, 1992

[86] PCT No.: PCT/DK92/00077

§ 371 Date: Dec. 21, 1993

§ 102(e) Date: Dec. 21, 1993

[87] PCT Pub. No.: WO92/16443

PCT Pub. Date: Oct. 1, 1992

[30] Foreign Application Priority Data

Mar. 14, 1991 [DE] Germany ............... 4108320

[51] Int. Cl.$^5$ ............................................. B65G 11/10
[52] U.S. Cl. .................................... 193/25 C; 193/30; 414/141.8; 414/143.1; 414/295; 414/299; 414/397
[58] Field of Search ............... 193/3, 25 C, 25 E, 30; 222/527, 529; 141/93, 95, 98, 198, 310; 414/140.5, 141.8, 143.1, 295, 299, 328, 329, 397

[56] References Cited

U.S. PATENT DOCUMENTS

| | | | |
|---|---|---|---|
| 3,428,156 | 2/1969 | Charyn et al. | 193/30 |
| 3,924,666 | 12/1975 | Raison | 193/30 |
| 4,727,913 | 3/1988 | Bliss | 193/25 C |
| 4,821,861 | 4/1989 | Shanahan | 193/25 E |
| 5,190,132 | 3/1993 | Stanelle et al. | 193/25 E |

FOREIGN PATENT DOCUMENTS

| | | | |
|---|---|---|---|
| 2744590 | 4/1979 | Germany | |
| 3721676 | 1/1988 | Germany | |
| 3708653 | 9/1988 | Germany | |
| 0304020 | 2/1989 | Germany | |
| 3727561 | 3/1989 | Germany | |
| 92005098 | 4/1992 | WIPO | 414/299 |

*Primary Examiner*—Joseph E. Valenza
*Attorney, Agent, or Firm*—Ladas & Parry

[57] ABSTRACT

A device for delivering flowable bulk material having a retractable loading chute (1) consisting of guide cones (2) for flowable material placed coaxially one above the other. In a retracted position of the loading chute (1) the guide cones nest in each other and in an extended position they define together with an outer mantle (7), a drop shaft. A wire or rope arrangement (11, 12) is adapted to retract and extend the loading chute (1) relative to an abutment or outlet cone (5). The loading chute (1) is of modular construction, each module comprising a guide cone (2), an outer tubewall module (7) and a rapid-securing device for securing the edges of the outer tube-wall module (7) to an upper and a lower guide cone (2). A closure cone (3), adapted to close an outlet opening (4) of the outlet cone (5), is connected to the lowermost guide cone (2), the closure cone (3) being adapted to be lowered relative to the outlet cone (5) for opening the outlet opening (4) of the loading chute (1).

9 Claims, 9 Drawing Sheets

DEVICE FOR DELIVERING FLOWABLE BULK CARGO

TECHNICAL FIELD

The present invention relates to a device for delivering flowable bulk cargo, said device being of the kind set forth in preamble of claim 1.

BACKGROUND ART

Various systems are known for loading or delivering flowable materials in bulk, the delivering or loading of such materials in those cases creating a considerable amount of dust. According to one of these systems, the loading chute consists of an extensible bellows with internally placed telescope tubes, on the lowermost end of which an outlet cone is secured. The outlet cone is closed by a vertically movable closure cone, and may be opened by lowering this closure cone. According to another system, disclosed in EP-A-0073349, a number of guide cones for the flowable material are used, said guide cones being placed above each other and mutually connected through chains, and are nested in each other in the retracted position of the loading chute. These guide cones for flowable material are placed inside a bellows, to the lowermost end of which the outlet cone is secured. Closing or opening of the loading chute is achieved by means of a separate mechanism at the uppermost end of the loading chute. In the case of damage to one of the parts of the loading chute, e.g. one of its uppermost guide cones for flowable material, it is necessary to remove each and every component from below upwardly in order to replace the damaged element; this requires a great amount of work, hence also a corresponding amount of time and funds.

DISCLOSURE OF THE INVENTION

It is the object of the present invention to provide a device for delivering flowable cargo of the kind referred to initially, which is simple in construction, allows a rapid exchange of worn parts and ensures reliable operation, ensuring also—even when the loading chute is very long in the extended position—a very small height requirement, when the loading chute is retracted.

According to the present invention, the above object is achieved in a device additionally exhibiting the features set forth in the characterizing clause of claim 1. Advantageous embodiments of the device according to the present invention exhibit the features set forth in the sub claims.

The modular construction of the loading chute makes it adaptable to varying conditions simply by inserting or removing modules, and it is especially advantageous that any worn components may be replaced without much effort. To this purpose, a module is advantageously assembled from a guide cone and an outer tube-wall module, each guide cone being connected to the next guide cone above or below through an outer tube-wall module, preferably at the outer ring of each guide cone. The wires or ropes for lowering (extending) and lifting (retracting) the loading chute are placed outside of the outer mantle of the loading chute formed by the outer tube-wall modules, preferably guided in eyes or hooks at each guide cone. This ensures on the one hand that the wires or ropes are placed outside of the dust zone, so that they are not contaminated during the loading operation, and on the other hand that the loading chute may easily be deflected sideways without affecting the parallelism between the cones and the outer tube-wall modules. In connection with the guiding of the wires or ropes it is advantageous to guide these components in conventional swing hooks (i.e. the kind of hooks used for suspending swings used e.g. on childrens playgrounds), such hooks allowing the wires or ropes to be disengaged. This makes it easier to replace worn parts in the intermediate region of the loading chute without having to dismantle each component from below and upwards up to the damaged component.

Preferably three wires or ropes are used for the loading chute, said wires or ropes being evenly distributed about the periphery, i.e. with 120° between them, secured to the lowermost guide cone for flowable material. In order to ensure an exact alignment of the closure cone and the lowermost guide cone for flowable material, the device comprises an adjustment and alignment mechanism for each wire or rope, said mechanism advantageously being constituted by an adjustable threaded bushing, to which the wire or rope is secured.

The outlet cone, which may also be called a coupling cone, as it is used to connect the lowermost end of the loading chute to a suitable receiving opening in a container, to which the flowable cargo is to be delivered, is suspended below the lowermost guide cone for flowable material through an extra outer-wall module. In case the outlet cone comes to rest on a vehicle to be loaded or on an opening in a container belonging to this vehicle, the loading chute is opened by moving the closure cone together with the lowermost guide cone downwardly, the opened position being reached as soon as the lowermost guide cone comes to rest on the outlet cone. This makes the open position of the loading chute visually observable from the outside, which is highly desirable. A further advantage with the device according to the present invention is that the wires or ropes are no longer directly connected to the closure cone, the latter being secured to the lowermost guide cone through tubes or the like. This makes it possible to keep the wires or ropes entirely outside of the dust zone, further allowing, when the outlet cone has come to rest as mentioned above, a further downward movement of the closure cone for opening the loading chute.

BRIEF DESCRIPTION OF THE DRAWINGS

In the following detailed portion of the present specification, the invention will be explained with reference to the in part highly diagrammatic drawings, in which.

DESCRIPTION OF THE PREFERRED EMBODIMENTS

Figure 1:
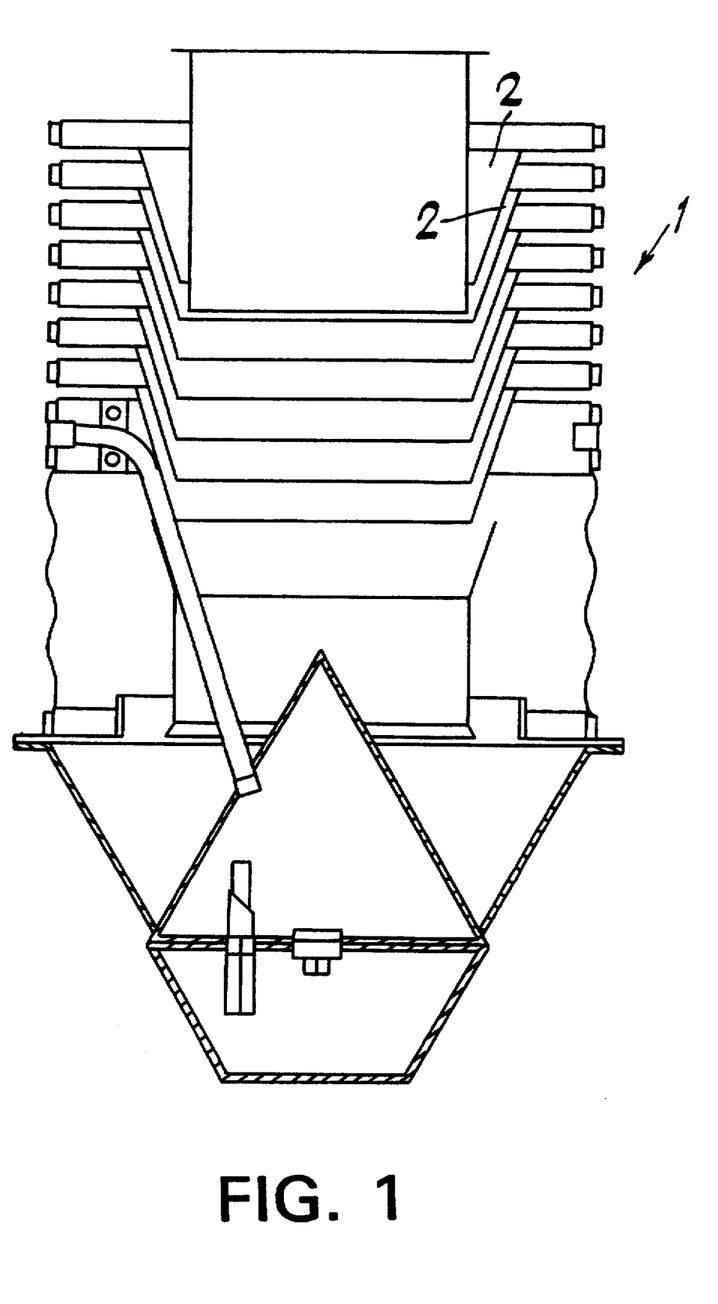
FIG. 1 is a radial section through a loading chute for flowable bulk cargo in its retracted position.
Figure 2:
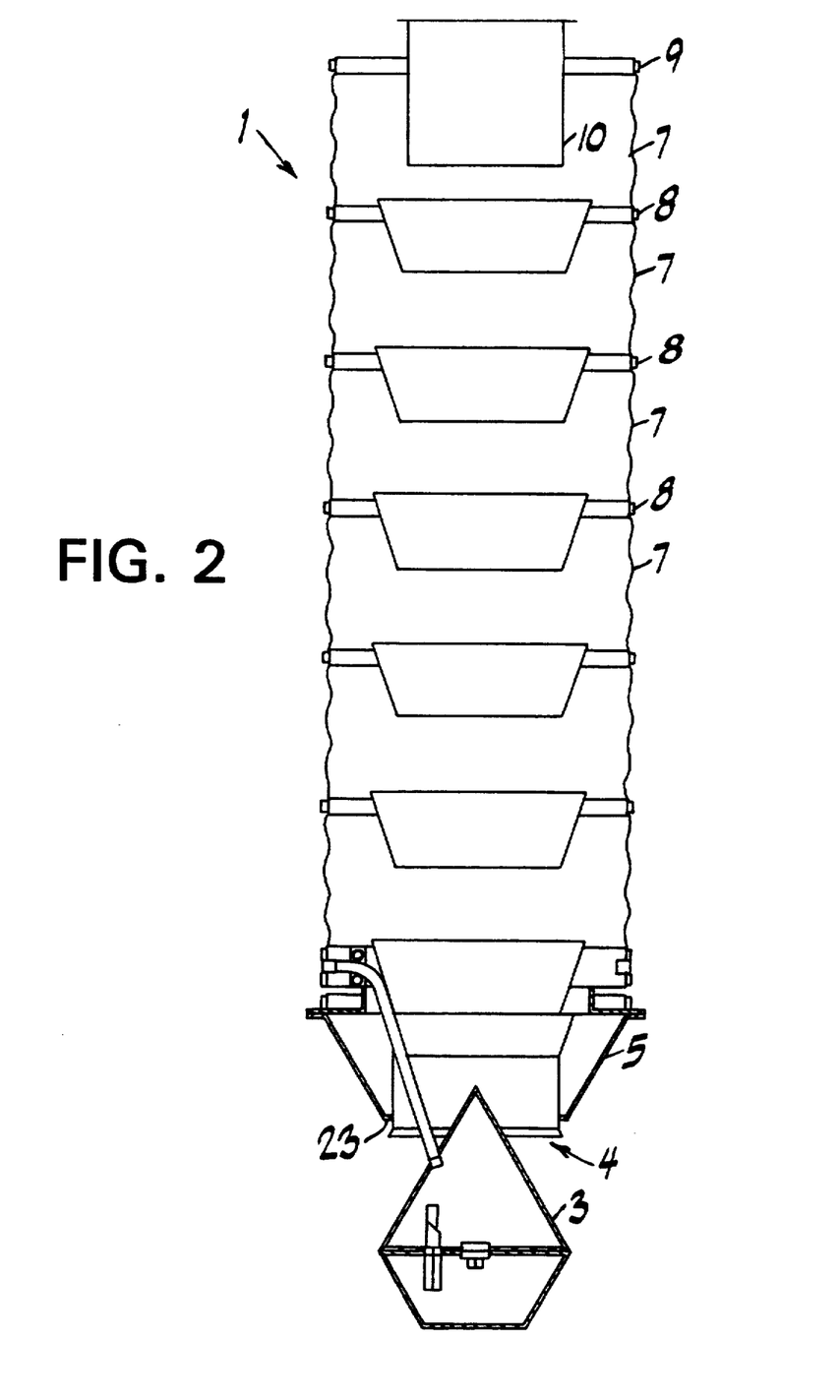
FIG. 2 shows the loading chute of FIG. 1 in its fully extended position with its outlet opening open, FIG. 3 with some additional details shows the loading chute of FIGS. 1 and 2 with its outlet opening closed.
Figure 3:
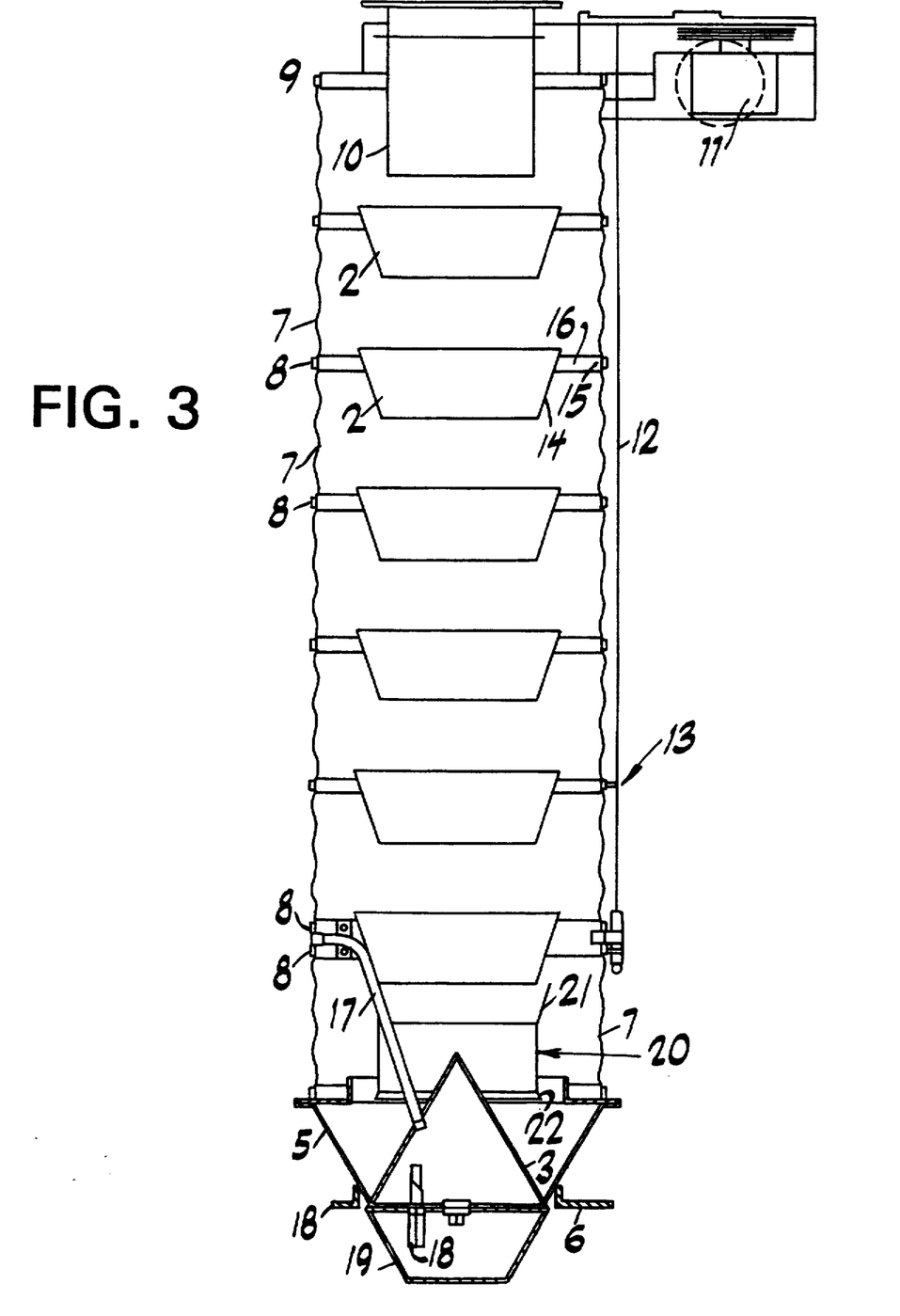

FIGS. 1—3 show a loading chute 1 belonging to a device for delivering flowable bulk cargoes in different operating positions. FIG. 1 shows the loading chute 1 in its retracted position, in which a number of guide cones 2, placed one above the other, are nested into each other. In the exemplary embodiment shown, the loading chute 1 comprises six guide cones 2 for flowable bulk material, but the chute may comprise a larger or smaller number of guide cones, depending on the application requirements in each case.

FIG. 3 shows the loading chute 1 in its fully extended position, in which a closure cone 3 closes the outlet opening 4 shown in FIG. 2 of an outlet cone 5. In the extended position shown, the outlet cone 5 may e.g. be seated on a dome cover 6 of a container vehicle (not shown) having been placed below the loading device. FIG. 2 shows the extended loading chute 1 in the position for delivering flowable bulk cargo, i.e. with the closure cone 3 moved away from the outlet opening 4.

The loading chute 1 is constructed in a modular manner, each module consisting of a guide cone, an outer tube-wall module 7, and a clamping ring 8 serving as a quick-coupling means.

The upper end of the loading chute 1 comprises a spacer ring 9 with an inner tube 10, by means of which the loading chute is suspended on a container (not shown) for flowable bulk cargo to be emptied.

As shown in FIG. 3, a drive unit 11 with three transverse wire pulleys for three lifting wires 12 is placed adjacent the upper end of the loading chute 1, said drive unit 11 being adapted to retract and extend the loading chute 1 between the positions shown in FIGS. 1 and 2. In the exemplary embodiment shown, three lifting wires 12 are used, being placed outside the internal space of the loading chute 1 and closed by the outer tube-wall modules 7 and distributed with angular distances of 120° around the periphery. Thus, the lifting wires 12 are placed outside of the zone containing flowable bulk cargo and dust, which is very important for the lifting-wire arrangement to function properly.

Figure 9:
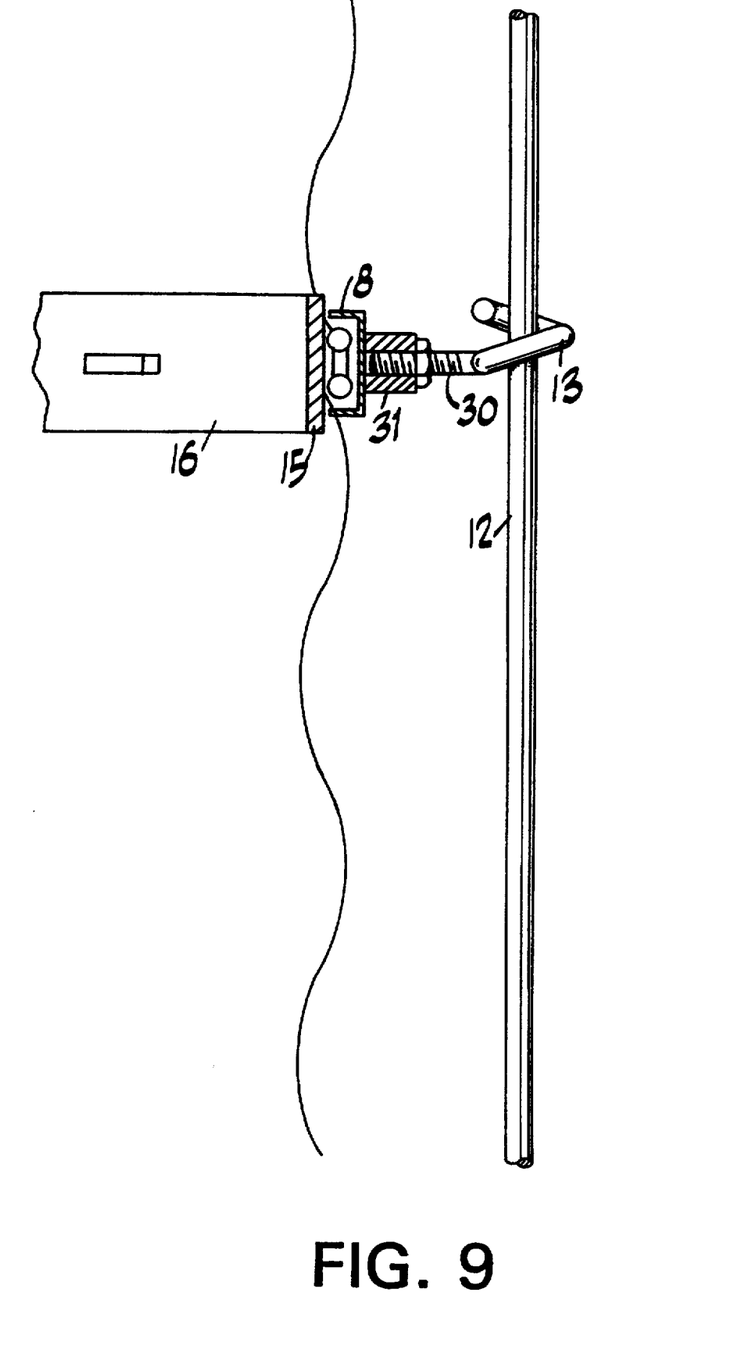

The three lifting wires 12, of which only a single one is shown in FIG. 3, are secured to the lowermost guide cone 2, this being achieved by means of an adjustment and alignment device shown in more detail in FIG. 9. The wires 12 are guided outside of the outer tube-wall modules 7, preferably at each module, i.e. each guide cone 2. The guiding is achieved by means of an eye 13 shown in FIG. 3, this eye being open, so that the wire 12 may be disengaged without the use of tools. This is advantageous, because it makes it possible, when need arises, to exchange intermediate modules without having to uncouple all the modules from below and upwardly. This guiding of the lifting wires 12 at each of the guide cones 2 also provides the advantage, that the loading chute 1 may be deflected sideways without effecting the parallelism from inlet to outlet as well as between the material flow and the outer chute, so that a reliable drawing-off and dust ensured.

Each guide cone 2 for flowable bulk material consists of a cone 14 and an outer ring 15, connected to each other by spokes 16 so as to form a "spider", cf. also FIG. 9.

The lowermost guide cone 2 for flowable bulk material comprises two clamping rings 8, as on this guide cone three tubes 17 belonging to the closure cone 3 and evenly spaced about the periphery are permanently supported. Further, an additional outer tube-wall module 7 is secured to the. lowermost guide cone 2 by means of a clamping ring 8, whereas the outlet cone 5 is secured to the lower end of this outer tube-wall module 7. Due to the purely diagrammatic nature of the drawing only a single support tube 17 is shown. These tubes 17 also serve as cable ducts for cables (not shown) to a filling-level sensor 18 placed inside the closure cone 3, the lower side of the latter being covered by a cap 19. An inner tube 20 forming the lowermost section of the shaft, through which the flowable material falls, is secured to the three tubes 17 and provided above with an inlet cone 21 corresponding to the inner cones 14 and below with a short diverging cone 22. In some cases, the lower cone 22 may be omitted.

Figure 6:
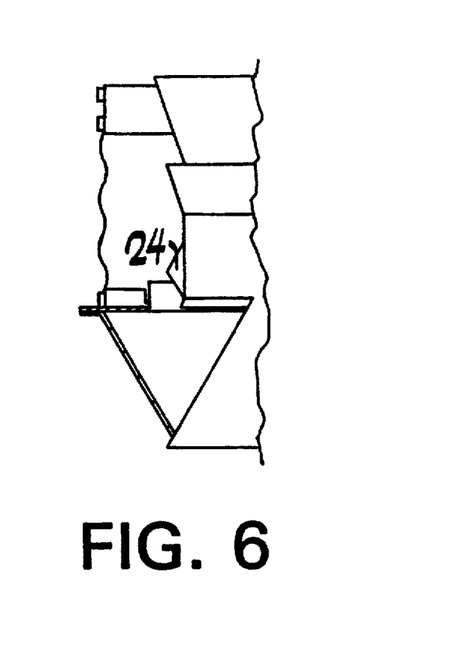
FIGS. 6 and 7 are partial views corresponding to that of FIG. 5 and illustrating the functioning of spacing means to achieve a uniform annular gap for exhausting dust-laden air.

The loading chute 1 operates in the following manner:

When a container, e.g. placed on a vehicle, to be filled has been placed below the loading chute 1 retracted in the position shown in FIG. 1, the loading chute 1 is extended by freeing the lifting wires 12 with consequent lowering of the guide cones 2 and the outlet cone 5, until the outlet cone 5 comes to rest on the filling opening of the container to be filled, e.g. the dome cover 6. By additional paying-out of the lifting wires 12 the lowermost guide cone 2 will move downwards relative to the outlet cone 5 resting on the dome cover 6, until the lowermost guide cone 2 comes to rest on the outlet cone 5 as shown in FIG. 2. In this position, the closure cone 3 is in its extreme lowermost position, so that the outlet cone 5 and the outlet opening 4 are fully unblocked and the flowable material (not shown) is delivered downwardly. This means that the extreme lowermost position of the closure cone 3 may be visually observed from the outside by observing the lowermost guide cone 2 coming to rest on the outlet cone 5 so that it is possible to see directly from the outside, whether the loading device is open or not. In the extreme lowermost position of the closure cone 3 shown in FIG. 2, the inner tube 20, preferably secured to the tubes 17 by welding, extends slightly downwardly beyond the outlet cone 5, defining together with the lowermost end of the outlet cone 5 an annular gap 23, through which the dust arising from the material flow is conducted upwards against the direction, in which the flowable material falls through the chute 1, the dust-laden air current then being exhausted through a branch pipe (not shown) at the upper end of the loading chute 1. In order to ensure a well-defined width of the annular gap 23, a number of sheet-metal spacers 24, e.g. three in number, may be placed on the periphery of the inner tube 20, cf. FIG. 6, said spacers 24 resting on the inner surface 25 of the outlet cone 5, when the closure cone 3 is in the extreme outermost or lowermost position, cf.

Figure 7:
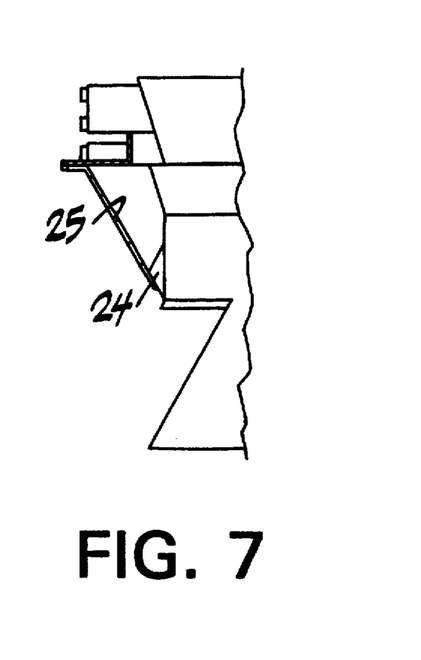
Figure 8:
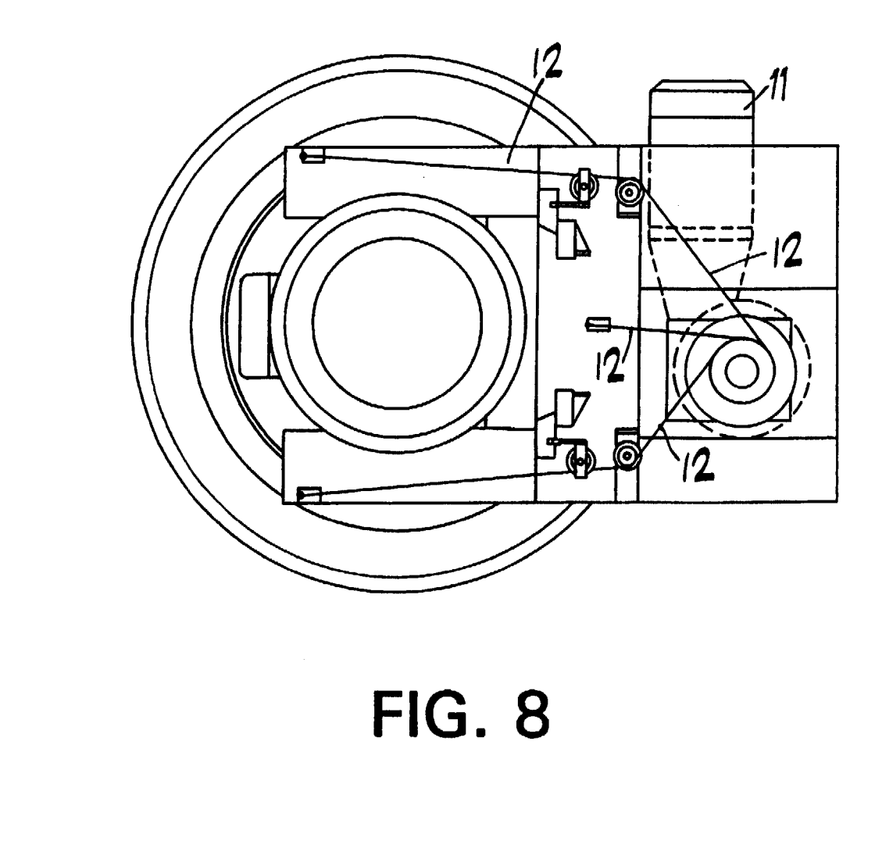
FIG. 8 shows the loading chute as viewed from above, showing diagrammatically the drive means for the lifting wires or ropes, FIG. 9 on a highly magnified scale shows details relating to the guiding of the lifting wires or ropes, FIG. 10 on the same scale as FIG. 9 shows an alignment mechanism for the lifting wires or ropes.
Figure 12:
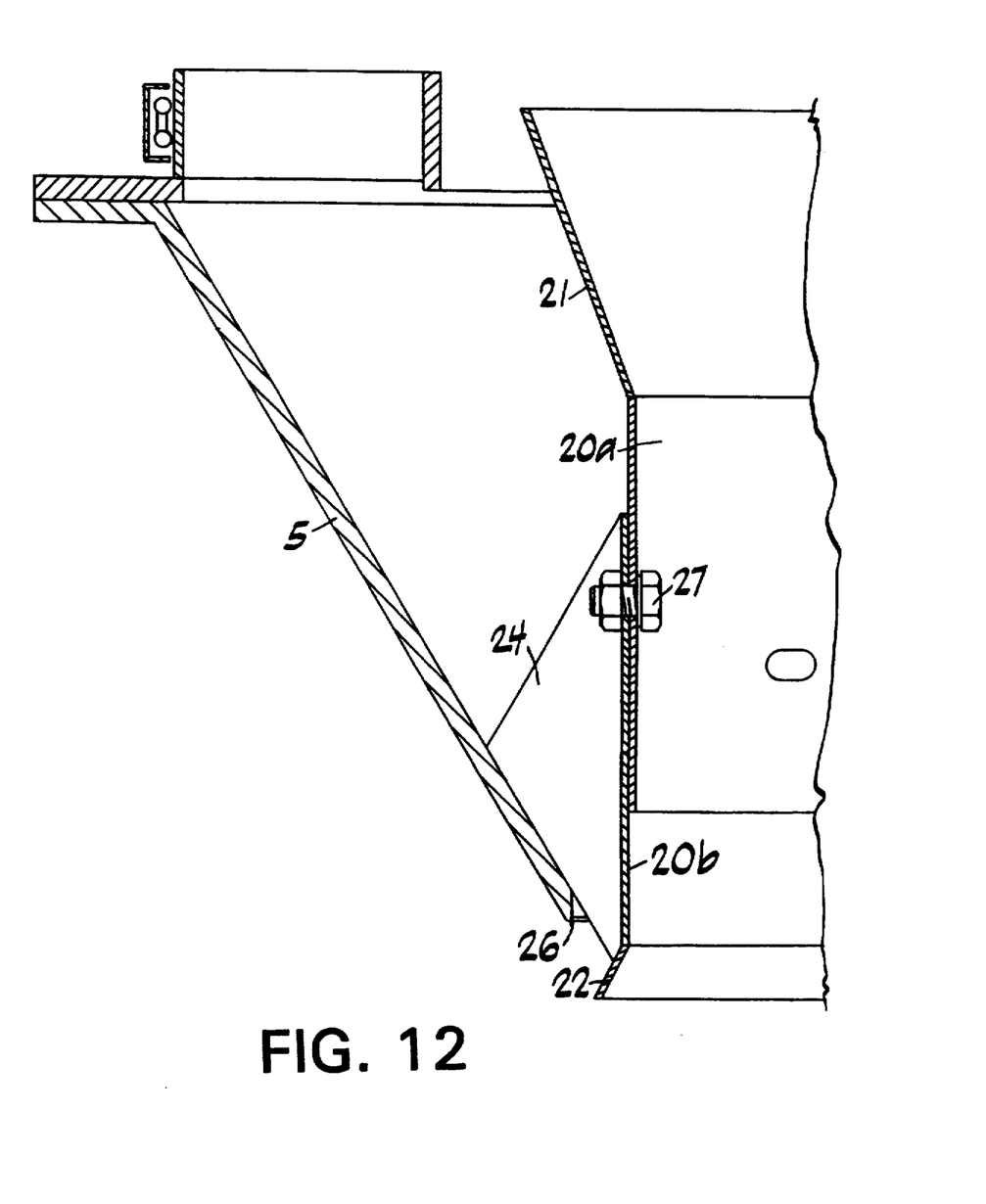
FIG. 12 shows a detail of an embodiment of the inner tube of the loading chute.

FIG. 7, and—shown in more detail—also FIG. 12. In FIG. 12 it is clearly seen that the lower end of the outlet cone 5 is provided with a chamfered edge 26, shaped to correspond to the surface of the closure cone 3, so that the latter in its extreme uppermost position can rest sealingly against the chamfered edge 26 on the outlet cone 5. In the exemplary embodiment shown in FIG. 12, the inner tube 20 is divided into two parts, consisting of an upper and a lower tube section 20a and 20b respectively adapted to the adjusted relative to each other in the axial direction by means of oblong holes (not shown) and to be fixed in the adjusted position by means of screw-and-nut means 27.

Figure 4:
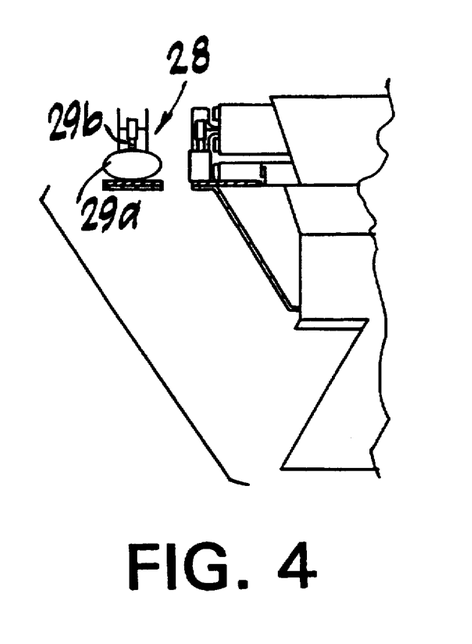
FIG. 4 shows a part of the loading chute of FIGS. 1–3 to illustrate the functioning of a limit switch.
Figure 5:
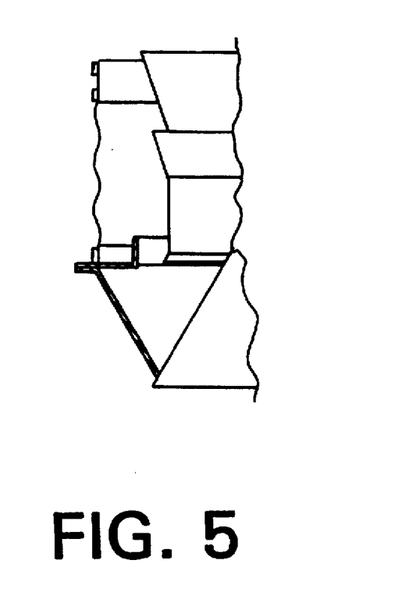
FIG. 5 shows a part of the lower region of FIG. 3 to illustrate an operating position.
Figure 13:
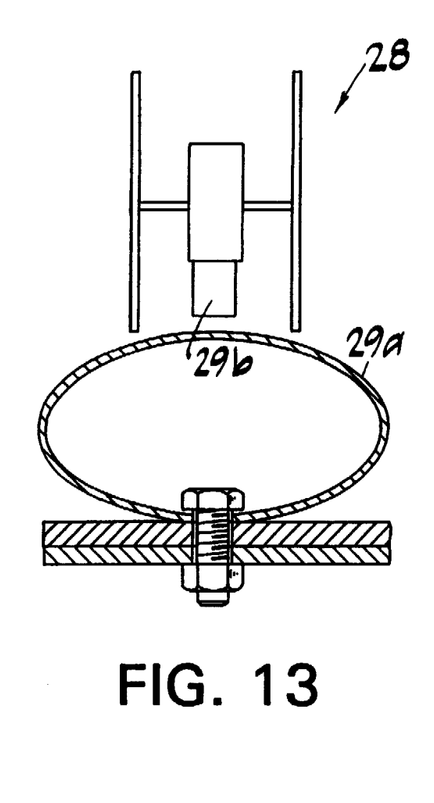
FIG. 13 and 14 show details of the limit-switch arrangement as viewed in two different directions.
Figure 14:
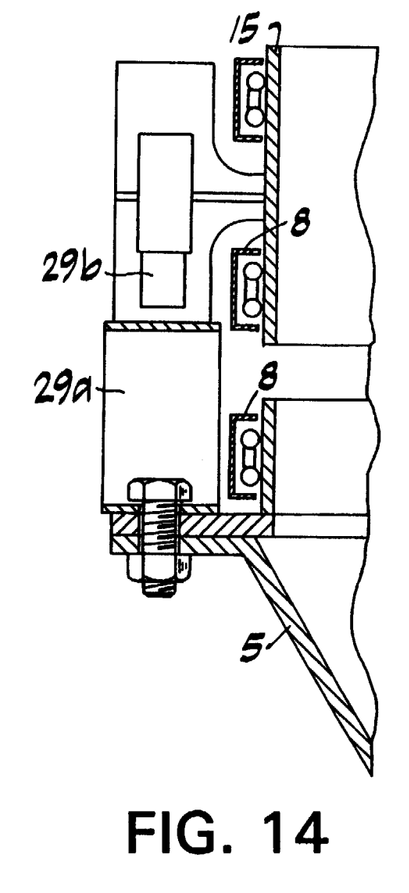

The position, in which the lowermost guide cone 2 comes to rest on the outlet cone 5, and hence in which the closure cone 3 is in its lowermost position, is signalled by a limit switch 28 shown in FIG. 4, said switch signalling to the drive unit 11 for the lifting wires 12 to stop. Advantageously, this limit switch is e.g. of the inductive type, consisting of a rubber buffer 29a and a sensor 29b permanently connected to the lowermost guide cone 2. The construction of the limit switch 28 is shown in more detail in FIGS. 13 and 14. A buffer made of sheet metal may also be used. The buffer provides the advantage of giving a certain amount of play, allowing a slight further downward movement.

FIG. 9 shows the lifting wires 12 being guided in the eyes 13 shaped like the hooks used for suspending swings. The eyes 13 make it possible to disengage one or more wires 12 from each guide cone 2, so that when a module in an intermediate part of the loading chute has been damaged, parts of this module may be exchanged with a minimum of effort. To facilitate exchange of a worn eye 13, each eye 13 is secured to or integral with a threaded bolt 30, which is screwed into a threaded bushing 31 on the clamping ring 8 and locked in position by a lock nut.

Figure 10:
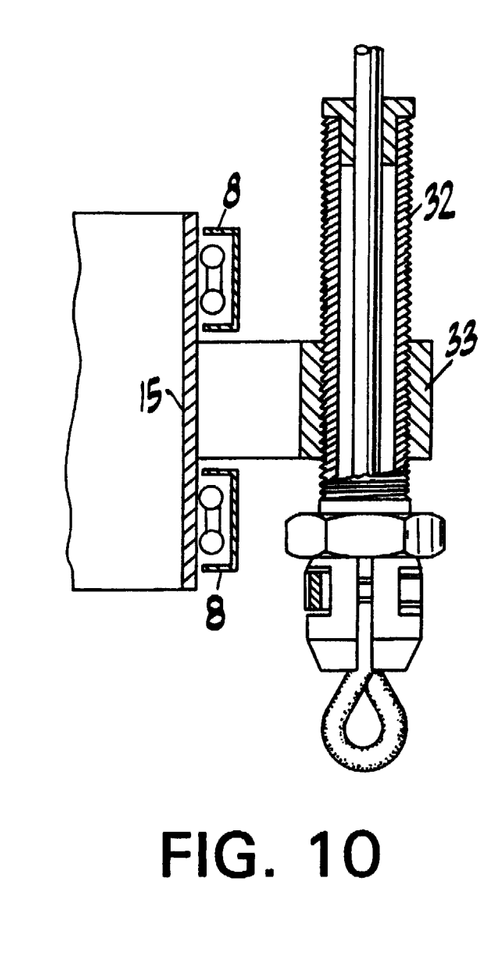
Figure 11:
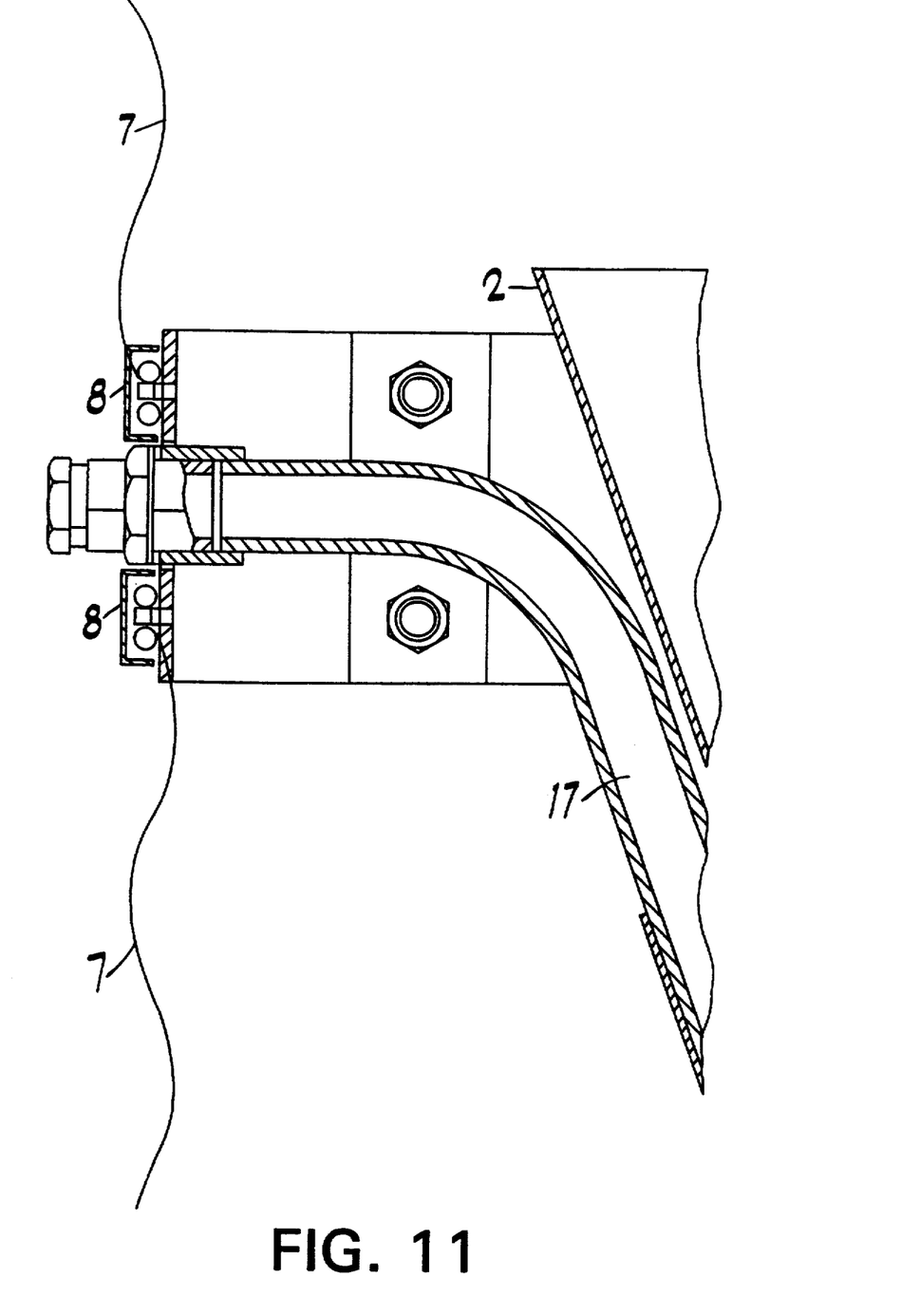
FIG. 11 shows a detail of the support tubes for the closure cone of the loading chute.

FIG. 10 shows the adjustment and alignment device for the closure cone 3 and the lowermost guide cone 2. For this purpose, the lifting wires 12 are secured in a threaded bushing 32 screwed into a threaded bushing 33 secured to the outer ring 15 belonging to the lowermost guide cone 2 (not shown) in FIG. 10. In this manner, it is possible to adjust the attachment points for the lifting wires 12 relative to each other, making it possible to achieve an exact alignment of the closure cone 3 with the outlet opening 4. Finally, FIG. 11 indicates how the three tubes 17 are secured to the lowermost guide cone 2 by means of threaded connections, providing the advantage that the tubes 17 with the closure cone 3 (not shown) may be removed after loosening the threaded connections.

LIST OF PARTS 1 loading chute
2 guide cone
3 closure cone
4 outlet opening
5 outlet cone
6 dome cover
7 outer tube-wall module
8 clamping ring
9 spacer ring
10 inner tube
11 drive unit
12 lifting wire
13 eye
14 (inner) cone
15 outer ring "spider"
16 spokes "spider"
17 (support) tube
18 filling-level sensor
19 cap
20 inner tube
20a upper tube section
20b lower tube section
21 inlet cone
22 lower/diverging cone
23 annular gap
24 sheet-metal spacer
25 inner surface
26 chamfered edge
27 screw-and-nut means
28 limit switch
29a rubber buffer
29b sensor
30 threaded bolt
31 threaded bushing
32 threaded bushing
33 threaded bushing

I claim:

1. Device for delivering flowable bulk material, said device being of the kind comprising
   a) a retractable loading chute (1) consisting of guide cones (2) for flowable material placed coaxially above each other, said guide cones (2) in the retracted position of the loading chute (1) being nested in each other and in the extended position together with an outer mantle (7) defining a drop shaft,
   b) a wire or rope arrangement (11, 12) adapted to retract and extend the loading chute (1),
   c) an abutment cone or outlet cone (5) having an outlet opening (4), and
   d) a closure cone (3) adapted to close the outlet opening (4) of the outlet cone (5), said closure cone (3) being adapted to be lowered relative to the outlet cone (5) for opening the outlet opening (4) of the loading chute (1) characterized in
   e) that the loading chute (1) is of modular construction, each module comprising a guide cone (2) for flowable material, an outer tube-wall module (7) and a rapid-securing device for securing the edges of the outer tube-wall module (7) to an upper and a lower guide cone (2) for flowable material, and
   f) that the closure cone (3) is connected to the lowermost guide cone (2) for flowable material.

2. Device according to claim 1, characterized in that the wire or rope arrangement (11, 12) preferably comprising three wires or ropes (12) distributed at intervals of 120° about the periphery, is secured to the lowermost guide cone (2) for flowable material and is placed outside of the outer tube-wall module (7) and hence outside of the drop shaft for flowable material and the dust zone.

3. Device according to claim 1, characterized in that the ropes or wires (12) are guided outside of the outer tube-wall module (7) of at least one of the guide cones (2) for flowable material of the loading chute (1).

4. Device according to claim 1 characterized in
   a) that each of the guide cones (2) for flowable material comprises an outer ring (15) secured through a number of radial members (16) distributed around the periphery,
   b) that the wires or ropes (12) are secured to the lowermost guide cone (2) for flowable material, preferably through an adjustment and alignment device (32, 33), and c) that the wires or ropes (12) are guided in eyes or hooks (13) secured to the remaining guide cones (2) for flowable material, said eyes or hooks (13) preferably being of a kind allowing disengagement of the wires or ropes.

5. Device according to claim 4, characterized in a) that the adjustment and alignment device for each wire or rope (12) comprises a threaded bushing (32), to which the wire or rope is secured, and which itself is screwed into a threaded bushing (33) in a part secured to the outer ring (15), and b) that the guiding eyes or hooks are constituted by swing hooks (13) similar to the hooks used for supporting playground swings, each of said hooks (13) being adapted to be screw-connected to the outer ring (15) or the rapid-securing device cooperating therewith by means of a screw connection (30, 31).

6. Device according to claim 1, characterized in that the rapid-securing device is constituted by a clamping ring (8) engaging the outside of the edges of two neighbouring outer tube-wall modules (7) and placed around the outer ring (15) of the guide cone (2) for flowable material.

7. Device according to claim 1, characterized in that the abutment cone (2) or outlet cone (5) is suspended below the lowermost guide cone (2) for flowable material through an outer tube-wall module (7).

8. Device according to claim 1, characterized in that the closure cone (3) is permanently secured to the lowermost guide cone (2) for flowable material through three tubes (17), preferably serving as cable ducts for a filling-level sensor (8) in the closure cone (3).

9. Device according to claim 8, characterized in a) that an inner tube (20) constituting the lowermost part of the drop shaft for the flowable material is secured to the three tubes (17) supporting the closure cone (3), said inner tube (20) together with the outlet opening (4) of the outlet cone for abutment cone (5) in the lowering position of the closure cone (3) defining an annular gap (23) for removing dust upwards, and b) that the annular gap (23) is preferably defined by means of radially directed sheet-metal spacers (24) placed around the periphery of the inner robe (20), said spacers (24) in the lowermost position of the closure cone (3) abutting against the inside wall (25) of the outlet cone or abutment cone (5).

* * * * *